United States Patent Office 2,987,407
Patented June 6, 1961

2,987,407
METHOD FOR ACCELERATING THE SETTING OF HYDRAULIC BINDERS
Leo Torsten Ulfstedt and Endel Wijard, Sodertalje, Anders Gustav Wastesson, Ronninge, and Karl Axel Jörgensen, Sodertalje, Sweden, assignors, by mesne assignments, to Casius Corporation Limited, Montreal, Quebec, Canada
No Drawing. Filed Aug. 15, 1958, Ser. No. 755,147
Claims priority, application Sweden Aug. 19, 1957
16 Claims. (Cl. 106—97)

This invention relates to a method for accelerating the setting of hydraulic binders and to the application of this method in connection with the manufacture of cement and concrete articles, such as building elements and the like.

For many purposes it is of interest to accelerate the setting and hardening of hydraulic binders. This is the case, for example, in the series production of concrete bodies by casting concrete in molds where it is desired to use the molds for several successive casting operations with the least possible loss of time. Another example is the manufacture of cellular concrete where it is desired to stabilize the pore structure and render the mass adapted for cutting as quickly as possible and thereby shorten the manufacturing process. Particularly in case of using hydraulic binders with a low hydraulic power, such as basic blast-furnace slag, hydraulic lime, shale ash and the like, with which the hardening reactions proceed very slowly, it is often important to accelerate said reactions and thus shorten the time required for hardening.

It is generally known that the setting and therefore the hardening of cement and similar hydraulic binders can be accelerated by the addition of small quantities of different chemicals. The best known and mostly used for this purpose are additions of more or less soluble sulphates such as gypsum, metal chlorides, especially calcium and sodium chloride but also aluminum chloride and ferric chloride, further alkali hydroxides, water-glass, alkali carbonates or phosphates. However, these additions often give rise to considerable disadvantages. Thus, for example, the chlorides often tend to promote corrosion and the alkali salts and sulphates increase the content of water-soluble salts in the product, whereby the risk of efflorescence is increased. In addition, the sulphates may have a detrimental effect due to the formation of sulphoaluminates.

According to the present invention it has now surprisingly been found that the setting process of hydraulic binders can be considerably accelerated without any of the above-mentioned disadvantages, if a small amount of a finely divided basic magnesium carbonate is added to the binder.

Based on this discovery, the process of the present invention comprises admixing the binder with a finely divided basic magnesium carbonate in an amount of about 0.1 to 5%, based on the weight of the binder.

It has been proved that in this way the time required to begin setting of the hydraulic binder may be reduced or shortened to only the half or third or fifth or still less of that required without addition of the basic magnesium carbonate. However, an essential condition for the obtaining of this favourable result is that the basic magnesium carbonate is in an extremely finely divided state or, in other words, that it possesses a very large surface.

In accordance therewith, the basic magnesium carbonate is preferably added in the form of the product known in the commerce as "light basic magnesium carbonate," also named "magnesia alba" when used for pharmaceutical purposes, the "apparent density" of which is <0.3. The composition of this product is not exactly known but it is assumed to correspond to the formula $3MgCO_3 \cdot Mg(OH)_2 \cdot 3H_2O$ or the formula $$4MgCO_3 \cdot Mg(OH)_2 \cdot 4H_2O$$

(Abegg: Handbuch der anorganischen Chemie, Zweiter Band, Zweiter Abteilung, Leipzig 1905), or the formula $$5MgO \cdot 4CO_2 \cdot xH_2O$$

in which the integer $x$ may be 6 or 5 depending on the method of preparing the compound (cf. Kirk-Othmer: Encyclopedia of Chemical Technology, volume 8, 1952, page 596).

As examples of the effect obtained by the addition of basic magnesium carbonate to hydraulic binders according to the invention, the following values may be mentioned which have been obtained by determination of the setting time according to the Vicat method (DIN 1164 § 24 b):

| Binder | Addition of light basic magnesium carbonate, percent | Setting begins after hours |
|---|---|---|
| Portland cement | | 3 |
| Do | 1 | ½ |
| Finely ground basic blast-furnace slag | | >10 |
| Do | 1 | 1½ |
| 10 parts Portland cement + 90 parts blast-furnace slag flour | | >5 |
| Do | 0.1 | 4 |
| Do | 0.5 | 2 |
| Do | 1 | ⅔ |

As may be seen from the table, the setting process is accelerated to a very great extent by the addition of the basic magnesium carbonate. This effect is specific and highly surprising, since neither neutral magnesium carbonate nor magnesium hydroxide has been found to possess any appreciable effect. In reality, Mg-salts are considered to be retarders of the setting of cement ("Proceeding of the Symposium on the Chemistry of Cements," Stockholm 1938, published by Ingenjörsvetenskapsakademien, Stockholm, 1939, page 299).

The method according to the invention may be advantageously applied to accelerate the setting process of hydraulic binders of different kinds. Generally, the term "hydraulic binder" used in the present specification and the appended claims is intended to comprise inorganic binders containing calcium silicate and/or calcium aluminate as hydraulic components. As examples hereof may be mentioned Portland cement, natural cement, hydraulic slag or slag cement, calcium aluminate cement, also hydraulic lime or mixtures of lime and materials of the pozzolan type or waste products, such as shale ash, fly ash, coke ash and the like.

The addition of the basic magnesium carbonate to the hydraulic binder may take place in different ways, for example by mixing the finely divided components in the dry state or by grinding them together by dry or wet grinding. In practice, generally amounts of from about 0.5 to 2% by weight, based on the hydraulic binder, have been found to be suitable. The addition of the basic magnesium carbonate, may, of course, be combined with the addition of other setting regulators known per se including those referred to above, under the assumption that this only takes place in such small quantities that no disadvantageous effects will result therefrom.

Furthermore, especially when the components are mixed in the wet state, a surface active agent may be added for facilitating the dispersion of the basic magnesium carbonate in the hydraulic binder. As examples hereof may be mentioned triethanolamine, which may be added in an amount of 0.01–0.1%, based on the weight of the hydraulic binder.

As examples of the application of the method of the invention in connection with the manufacture of cement and concrete and articles thereof may especially be mentioned the manufacture of slag cement and the production of building elements of cellular concrete. For this purpose, the hydraulic binder is mixed with basic magnesium carbonate in the proportions indicated above and with other conventional components of such compositions in suitable proportions to form the desired slag cement or cellular concrete composition. Owing to the addition of the basic magnesium carbonate, the setting of the cement or concrete mass takes place in a considerably shorter time than is otherwise the case. In other respects the manufacture is carried out and proceeds as known per se, and, consequently, the total time required for the manufacture is correspondingly shortened.

The preparation of the improved slag cement may take place by admixing the finely ground slag and cement components, which may be ground separately or together, with the basic magnesium carbonate in an amount within the range 0.1 to 5% by weight, based on the weight of the hydraulic components. The mixture may also be prepared by grinding all three components together.

For the manufacture of concrete bodies, such as building elements, of the improved cellular concrete according to the invention, a mixture of sand or other siliceous minerals having a high content of silica, Portland cement, basic blast-furnace slag, ground cement clinker or other hydraulic binders is prepared as known per se and is admixed with basic magnesium carbonate in an amount of from 0.1 to 5% by weight, based on the weight of the hydraulic components of the composition. Water is added to produce a slurry which is poured into molds and the mass is rendered porous and caused to expand by adding a gas developing agent, such as a metal powder, or foam thereto in the usual manner, whereupon the mass is allowed to set. Due to the addition of the basic magnesium carbonate, the setting then takes place much more rapidly than would otherwise be the case. The final hardening of the mass takes place as usual and is preferably effected by a steam-curing treatment under a pressure of 5–15 kg./cm.$^2$.

As a result of the addition of the basic magnesium carbonate not only is the setting of the concrete accelerated but in addition thereto also the strength properties of the concrete bodies are increased by 30–35%.

The manner of carrying out the invention in practice is by way of example described more in detail in the following examples.

Example 1

A slag cement is produced by grinding together the following components:

| | Parts by weight |
|---|---|
| Granulated basic blast-furnace slag | 25–65 |
| Portland cement clinker | 35–75 |
| Light basic magnesium carbonate | 0.5–2 |

By the addition of the basic magnesium carbonate the time required before setting begins is reduced from >5 hours to 1–2 hours.

Example 2

A slag cement is prepared by grinding together 100 parts by weight of granulated blast-furnace slag and 0.5–2 parts by weight of light basic magnesium carbonate. This slag cement may then be mixed with aggregate and water to form a concrete mixture.

It is also possible to subject the slag separately to wet grinding and then add the basic magnesium carbonate simultaneously with the aggregate to the slag sludge obtained by the grinding.

The slag cement or concrete, respectively, produced in this manner is especially suitable for dam construction.

Example 3

For the manufacture of cellular concrete, slag and sand are ground separately or together to fine powder form. These powders are then mixed with water to form a slurry and Portland cement or ground cement clinker may be added thereto to obtain a mixture containing the solid components in the following proportions:

| | Parts by weight |
|---|---|
| Sand | 20–50 |
| Granulated basic blast-furnace slag | 10–70 |
| Portland cement or cement clinker up to | 30 |
| Light basic magnesium carbonate | 0.1–3 |

To this slurry is then added a gas developing agent, for example 0.01–0.5 parts by weight of aluminum powder, or a foam is mechanically incorporated therein, to produce porosity in the mass and expansion thereof. When this has taken place it is desired to obtain the mass in a condition sufficiently set for cutting as soon as possible and, due to the addition of the basic magnesium carbonate, the time required herefore is shortened from >24 hours to only 4 to 10 hours. The mass is then cut or sawn into slabs or smaller blocks which are left to undergo the final hardening to obtain their maximum strength. Generally, this hardening is promoted by subjecting the concrete to a steam-curing in autoclaves at a pressure of 5–15 kgs./cm.$^2$ for, say, 5–20 hours.

If the final hardening is effected by steam-curing it is essential that the sand contains quartz or other siliceous minerals having a high content of silica. The sand may also be replaced wholly or partly by fly ash, shale ash or the like.

Concrete bodies produced in accordance with this example having an apparent density of 0.5 have been found to have a mechanical strength of 40 kgs./cm.$^2$ while concrete bodies produced from the same concrete mixture without addition of basic magnesium carbonate and of the same density only possess a strength of 30 kgs./cm.$^2$.

Example 4

A cellular concrete is prepared from the following components:

| | Parts by weight |
|---|---|
| Sand | 50–80 |
| Portland cement clinker ground to cement fineness | 20–50 |
| Light basic magnesium carbonate | 0.2–2.5 |
| Potash | 0.1–2.0 |

Distinguished from Example 3, in this case no blast-furnace slag is added as hydraulic component of the mixture and further the basic magnesium carbonate is used in combination with potash as a setting time regulator. In other respects the manufacture is carried out in the same manner as in Example 3.

What we claim is:

1. In the manufacture of slag cement, the process of forming a mixture comprising a finely ground blast-furnace slag and Portland cement, and incorporating with said mixture a finely divided basic magnesium carbonate in an amount of from about 0.1 to 5%, based on the weight of the hydraulic components of the mixture, to accelerate the setting of the mixture.

2. In the manufacture of slag cement, the process of forming a mixture containing from about 25 to 65 parts by weight of finely ground basic blast-furnace slag and from about 35–75 parts by weight of a finely ground Portland cement clinker, and incorporating with said mixture light basic magnesium carbonate having an apparent density <0.3 in an amount of from about 0.5 to about 2 parts by weight, to accelerate the setting of the mixture.

3. In the manufacture of building elements of cellular concrete, the process consisting of forming a mixture from about 20 to 50 parts by weight of a siliceous mineral having a high content of silica, from about 10 to 70 parts by weight of finely divided basic blast-furnace slag and up to 30 parts by weight of Portland cement, and admixing therewith light basic magnesium carbonate having an apparent density <0.3 in an amount of from about 0.1 to 3 parts by weight, adding water to the mixture to form a slurry, pouring the slurry into molds, adding from about 0.01 to 0.5 parts by weight of aluminum powder to produce porosity in the mass, and then allowing the mass to set, the setting being accelerated by the presence of the said basic magnesium carbonate.

4. The method of claim 3, wherein the concrete is subjected to a steam-curing at a pressure of 5–15 kg./cm.²

5. The method of claim 3, wherein an amount of from 0.01 to 0.1% of triethanolamine, based on the weight of the hydraulic binder, is added to facilitate the dispersion of the basic magnesium carbonate in the mixture.

6. In the manufacture of building elements of cellular concrete, the process which consists essentially of forming a mixture comprising from about 50 to 80 parts by weight of a finely ground sand having a high content of silica, from about 20 to 50 parts by weight of finely ground Portland cement clinker, and adding thereto light basic magnesium carbonate having an apparent density <0.3 in an amount of from 0.2 to 2.5 parts by weight, adding water to the mixture to form a slurry, pouring the slurry into molds, mechanically forming a foam in the mixture to produce porosity therein, and then allowing the mass to set, the setting being accelerated by the presence of said basic magnesium carbonate, and then subjecting the concrete to a steam-curing at a pressure of 5–15 kgs./cm.²

7. A cementitious composition composed of finely ground sand having a high content of quartz, finely ground basic blast-furnace slag and finely ground Portland cement clinker, in a mixture with light basic magnesium carbonate having an apparent density of <0.3, in an amount of from about 0.1 to about 5%, based on the weight of the hydraulic components of the mixture.

8. A cementitious composition composed of finely ground sand having a high content of quartz, finely ground basic blast-furnace slag and finely ground Portland cement clinker, in combination with light basic magnesium carbonate having an apparent density of <0.3, in an amount of from about 0.1 to about 5%, based on the weight of the hydraulic components of the mixture.

9. In the manufacture of slag cement, the process of forming a mixture of a finely ground blast-furnace slag and Portland cement, and adding to said mixture a finely divided basic magnesium carbonate in an amount of from about 0.1 to 5%, based on the weight of the hydraulic components of the mixture, to accelerate the setting of the mixture.

10. In the manufacture of slag cement, the process of forming a mixture of from about 25 to 65 parts by weight of finely ground basic blast-furnace slag and from about 35–75 parts by weight of a finely ground Portland cement clinker, and adding to said mixture light basic magnesium carbonate having an apparent density <0.3 in an amount of from about 0.5 to about 2% parts by weight, to accelerate the setting of the mixture.

11. A slag cement consisting of the following components:

| | Parts by weight |
|---|---|
| Granulated basic blast-furnace slag | 25–65 |
| Portland cement clinker | 35–75 |
| Light basic magnesium carbonate | 0.5–2 |

12. A cellular concrete mixture composed of the following proportions:

| | Parts by weight |
|---|---|
| Sand | 20–50 |
| Granulated basic blast-furnace slag | 10–70 |
| Portland cement or cement clinker up to | 30 |
| Light basic magnesium carbonate | 0.1–3 |
| Gas developing agent | Small |

13. A cellular concrete composed of the following:

| | Parts by weight |
|---|---|
| Sand | 50–80 |
| Portland cement clinker ground to cement fineness | 20–50 |
| Light basic magnesium carbonate | 0.2–2.5 |
| Potash | 0.1–2.0 |

14. In the manufacture of cementitious compositions, the process of forming a mixture consisting of a finely ground basic blast-furnace slag and Portland cement, and adding thereto a finely divided basic magnesium carbonate in an amount of from about 0.1 to 5%, based on the weight of the hydraulic components of the mixture, to accelerate the setting of the mixture.

15. The process as set forth in claim 14, in which finely ground Portland cement clinkers are added with the Portland cement.

16. The method of claim 14 wherein the basic magnesium carbonate is added in the form of light basic magnesium carbonate having an apparent density of <0.3.

References Cited in the file of this patent

UNITED STATES PATENTS

| 2,023,001 | Billner | Dec. 3, 1935 |
| 2,077,374 | Grossinger | Apr. 13, 1937 |
| 2,416,035 | Whittier | Feb. 18, 1947 |
| 2,437,842 | Uhler | Mar. 16, 1948 |
| 2,517,993 | Falco | Aug. 8, 1950 |